F. H. ROYCE.
LUBRICATING MEANS FOR THE VALVE GEAR OF INTERNAL COMBUSTION ENGINES.
APPLICATION FILED MAR. 13, 1918.
1,298,099.
Patented Mar. 25, 1919.
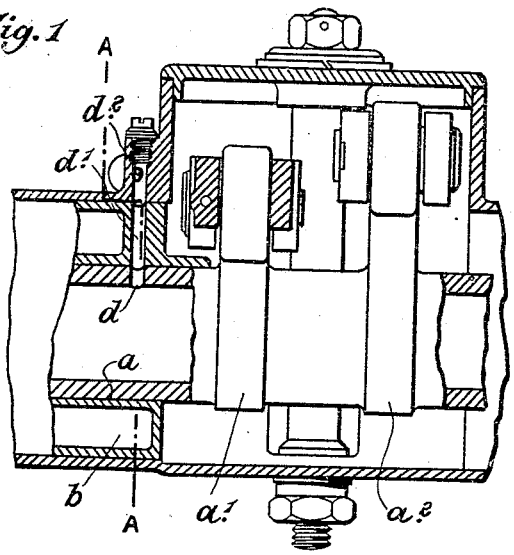
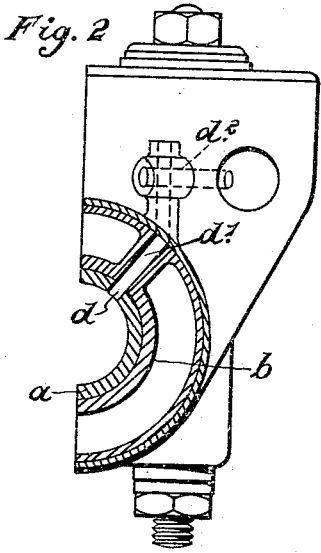
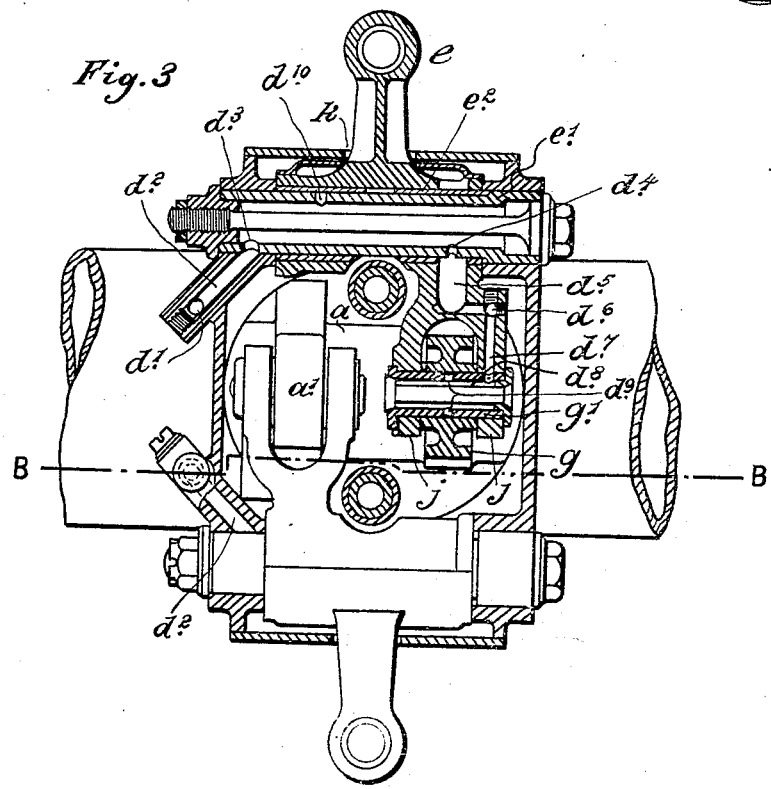
Inventor:
Frederick Henry Royce.
by his Attorney

UNITED STATES PATENT OFFICE.

FREDERICK HENRY ROYCE, OF DERBY, ENGLAND, ASSIGNOR TO ROLLS ROYCE LIMITED, OF DERBY, ENGLAND.

LUBRICATING MEANS FOR THE VALVE-GEAR OF INTERNAL-COMBUSTION ENGINES.

1,298,099.

Specification of Letters Patent. Patented Mar. 25, 1919.

Application filed March 13, 1918. Serial No. 222,177.

*To all whom it may concern:*

Be it known that I, FREDERICK HENRY ROYCE, engineer, a subject of the King of England, of Derby, in the county of Derby, England, have invented certain new and useful Improvements in Lubricating Means for the Valve-Gear of Internal-Combustion Engines, of which the following is a specification.

This invention relates to an improved means for lubricating the valve mechanisms of internal combustion engines, particularly those situated over the cylinder heads, and has for its object to more effectively lubricate all the moving parts than has been done hitherto. Such engines are commonly arranged with a cam actuating rocking lever to operate the valves and the rocking levers are provided with rollers mounted on the rocking levers and engaging the cam surfaces.

It has been the practice in the past to lubricate the cam, the fulcrum of the rocking lever and the rollers by means of a "splash" system which has proved unsatisfactory particularly with respect to the rollers.

According to this invention a means of supplying lubricant under pressure to the working surfaces is provided which will not only more efficiently lubricate the said parts but also dispense with oil suspended in the cam shaft casing other than leakage oil and so avoid or reduce to a minimum leakage of oil at the aperture in the casing through which the valve-rocking lever operates particularly owing to tilting of the engine.

It has been proposed to lubricate the working parts of such engines by introducing oil under pressure into a hollow fixed, revolving or oscillating shaft having holes through its periphery or circumference communicating with its bearings or bearing surface to lubricate same, and also like holes from time to time registering with orifices (in the bearings of the shaft, or member bearing thereon as the case may be) of pipes or passage ways to conduct oil to and lubricate other parts of the mechanism, but no satisfactory arrangement has ever been made to efficiently lubricate the rollers together with other parts of the mechanisms referred to in substitution of the "splash" system.

According to the present invention the rotating cam shaft, the fixed fulcrum pin of the rockers, and the fixed spindle of the rollers are made hollow and provided with means for introducing oil under pressure, in the first instance into the cam shaft, and by means of holes and pipes or passageways said oil is caused to flow into the other shafts, and lubricate the bearings of the cam shaft and the surfaces of the fulcrum pin and spindle and by reason of oil escaping or oozing past or around the rollers to lubricate the cam surfaces.

The invention is illustrated in the accompanying drawings in which Figure 1 is a part sectional elevation through the cam-shaft casing on the line B—B of Fig. 3. Fig. 2 is a section on line A—A of Fig. 1; and Fig. 3 a plan view of Fig. 1 with parts in section.

$a$ designates the hollow camshaft on which are mounted the cams $a^1$ and $a^2$, one of the camshaft bearings being shown at $b$. $d$ is a hole in the camshaft which registers with two holes $d^1$ (one only of which is shown) in the camshaft bearing and the holes $d^2$ in the casing; $e$ designates the valve-rocking lever and $e^1$ a hollow fulcrum pin for same $e^2$ being a bush for said lever. A hole $d^3$ in the rocker fulcrum pin $e^1$ registers with the hole $d^2$ in the casing and $d^4$ designates a hole in said rocker fulcrum pin which registers with a hole $d^5$ in the rocker bush $e^2$. $g$ designates the roller of the valve rocker mounted on a hollow spindle $g^1$ between the jaws $j$ and $d^6$ a passage-way from the hole $d^5$ to a passage-way $d^7$ along one of the jaws. $d^8$ shows a hole through the hollow spindle $g^1$ and $d^9$ are other holes also through said spindle to the bearing surface of same; $d^{10}$ is a hole through the rocker fulcrum pin $e^1$ to the bearing surface of same.

The lubricant is forced under pressure into the hollow camshaft $a$ whence it passes through the holes and passages $d$, $d^1$, $d^2$ and $d^3$ into the hollow fulcrum pin $e^1$ and thence through the hole $d^{10}$ to lubricate the bearing surface of said pin and through the holes and passage ways $d^4$ $d^5$ $d^6$ $d^7$ and $d^8$ into the hollow roller spindle $g^1$ and thence through the holes $d^9$ to lubricate the bearing surface of the same. Oil escaping past the roller lubricates the cam surface, and is collected in the bottom of the casing and suitably drained away.

It will be observed that by the means described a positive method of lubricating the camshaft bearings, the fulcrum of the valve rocker, the bearing for the valve roller, and the cam surface is provided and by this means the necessity of using an oil bath or its equivalent in the cam shaft casing is avoided and thus the parts can be effectively lubricated without incurring the loss of oil through the aperture $k$ through which one arm of the valve rocker $e$ protrudes.

It has been previously proposed to lubricate various bearings of internal combustion engines by means of hollow axles or spindles and passage ways formed in different parts with ports or openings registering with one another so as to form a canal system through which oil under pressure can be distributed to the various bearings but it is considered novel to arrange a system, according to my invention, in which the lubricant is conducted to the surface bearing of the spindles of, and by consequential crepitation to the outer surface of rollers in contact with the cams operating the valves whereby the surfaces of such cams are lubricated and the necessity of the "splash" system avoided.

What I claim as my invention and desire to secure by Letters Patent of the United States is:—

1. In valve mechanism for internal combustion engines comprising a cam shaft operating a rocker adapted to control a cylinder valve said rocker being furnished with a roller bearing on a cam on said shaft, a lubricating system consisting of a hollow cam shaft adapted to receive lubricant under pressure, a hollow fulcrum pin for the valve rocker, a hollow spindle for the roller with means of communication between the cam shaft and the fulcrum pin and between the latter and the roller spindle and means of communication between the interiors of the fulcrum pin and roller spindle and the outer surfaces thereof.

2. In valve mechanism for internal combustion engines comprising a cam shaft operating a rocker adapted to control a valve, said rocker being furnished with a roller bearing on a cam on said shaft, a lubricating system comprising a hollow cam shaft adapted to receive lubricant under pressure, a hollow fulcrum member for the rocker, a hollow bearing element for the roller and means for passage of lubricant between the cam shaft and the fulcrum member and between the latter and the bearing element for the roller.

In witness whereof I have signed this specification in the presence of a witness.

FREDERICK HENRY ROYCE.

Witness:
F. PARSONS.

Copies of this patent may be obtained for five cents each, by addressing the "Commissioner of Patents, Washington, D. C."